Figure 3:
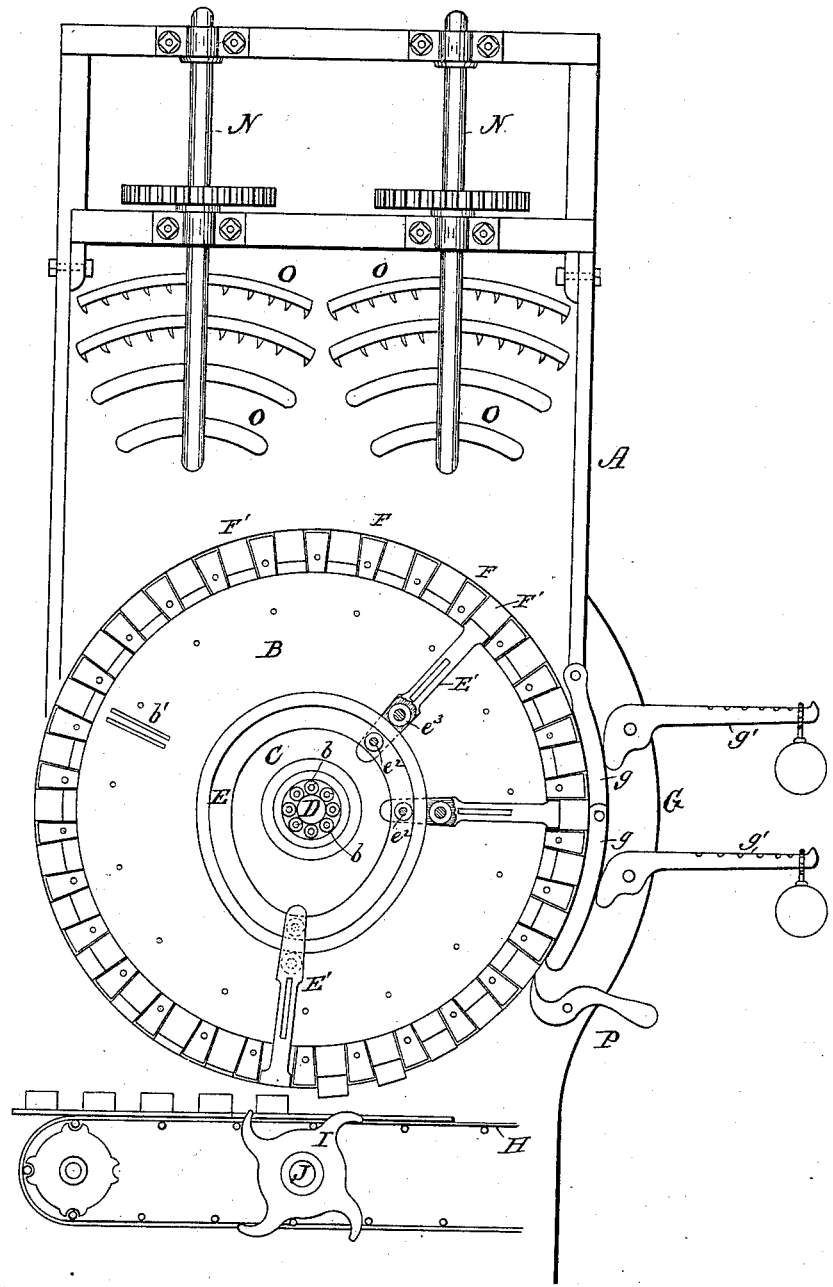

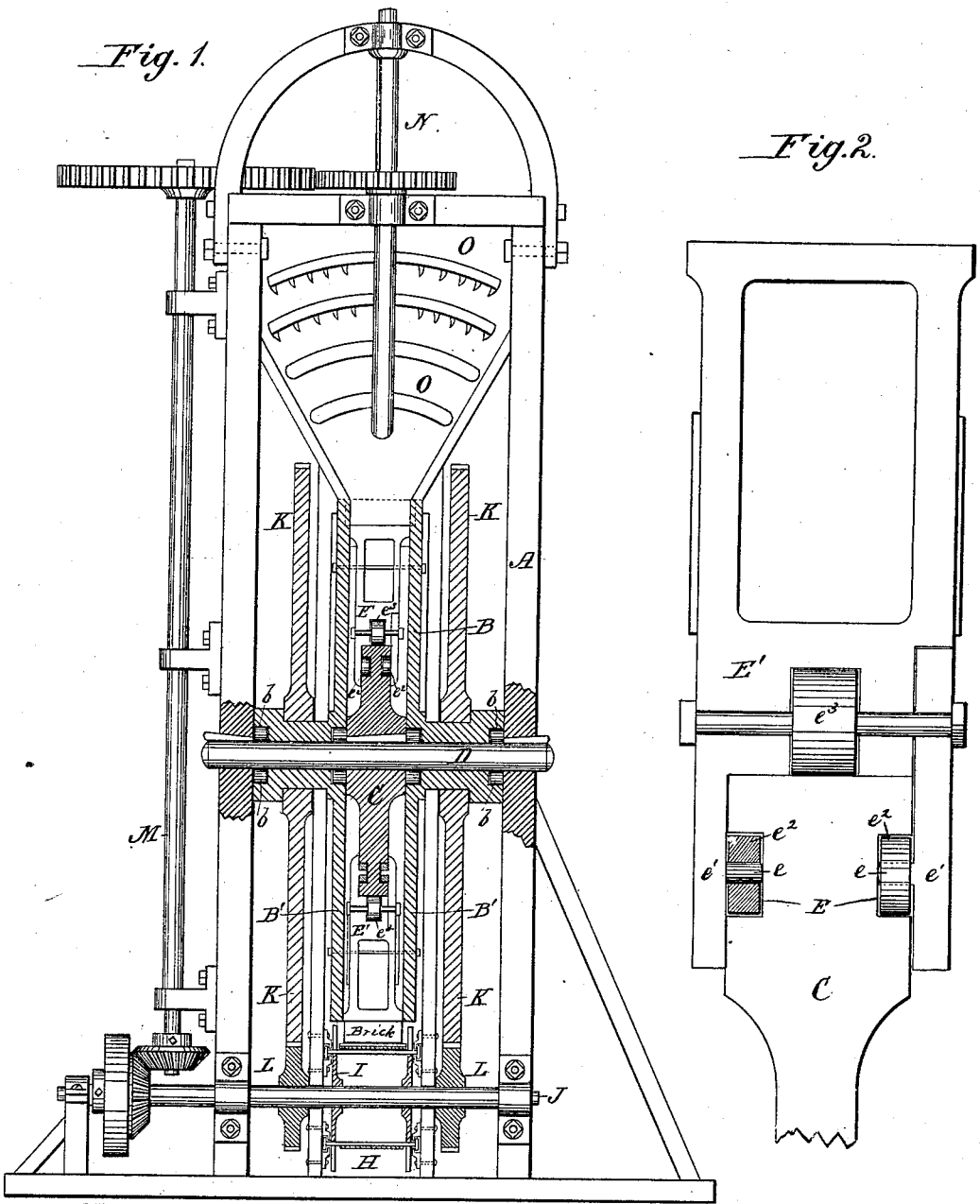

(No Model.) 2 Sheets—Sheet 2.

J. O. SMITH.
BRICK MACHINE.

No. 265,883. Patented Oct. 10, 1882.

WITNESSES:
W. W. Hollingsworth
A. L. Lyne

INVENTOR:
John O. Smith
BY
ATTORNEYS.

UNITED STATES PATENT OFFICE.

JOHN OWEN SMITH, OF SAVANNAH, GEORGIA, ASSIGNOR TO HIMSELF AND WM. FRANCIS CHAPLIN, JR., OF SAME PLACE.

BRICK-MACHINE.

SPECIFICATION forming part of Letters Patent No. 265,883, dated October 10, 1882.

Application filed April 8, 1882. (No model.)

*To all whom it may concern:*

Be it known that I, JOHN OWEN SMITH, of Savannah, in the county of Chatham and State of Georgia, have invented a new and useful Improvement in Brick-Machines, of which the following is a full, clear, and exact description, reference being had to the annexed drawings, forming part of this specification.

This invention relates to brick-machines having a wheel provided with molds, in combination with eccentrically-operated plungers and propellers for feeding the clay to the molds.

In the accompanying drawings, Figure 1 is a vertical section of my improved brick-machine; Fig. 2, a detail view, showing the plunger enlarged; and Fig. 3 is a side elevation of the machine with a part of frame-work removed.

My invention has for its object to provide a machine which will grind the clay as it comes from the bank, feed it into the molds, press the bricks in the molds, and eject them upon boards arranged on a traveling apron, by which they are to be conveyed to the kiln.

The machine, which is to be driven by steam or any other suitable power, is provided with a supporting-frame, A, made preferably of iron, in the lower part of which is supported the mold-wheel B. The wheel B is formed of two shells, B', and between these shells is a cam, C, keyed upon a shaft, D, which is rigidly supported in the sides of the frame A. In opposite sides of the cam C are formed continuous recesses E, parallel with the periphery thereof. The plunger E', which is arranged in engagement with the cam, is formed with parts e' overlapping the sides of the cam, and upon the inner surface of these parts, one of which is made removable from the plunger, are provided projections e, which form bearings in the recesses E for the friction-rollers e². A friction-roller, e³, is journaled in a recess formed in that portion of the plunger which rests upon the periphery of the cam. The shells B' are provided with hubs on the outer sides, which are journaled upon the shaft D, and between the shells, in recesses near their peripheral edges, are secured partitions F, having the form of truncated wedges, arranged in such manner as to form rectangular molds F'. The outer ends of the plungers E', which are arranged to be reciprocated in the molds, form the bottoms thereof. To lessen friction the hubs of the shells B' are provided at their inner and outer sides with recesses, in which are placed rollers b, adapted to rotate in contact with the shaft D. On the inner surface of the shells, also, are provided guides b' for the plungers.

The object of forming the molds by means of removable partitions, as above described, is to make repairing, in case a mold is broken by a stone in the clay, a matter of comparative ease, since a new partition may be readily substituted for a broken one. As a further means of providing against damage to the machine by stones in the clay, I construct the press G of plates g, hinged together, and provide weighted levers g', by means of which the pressure may be regulated at will. In case a stone strikes one of the plates by the revolution of the wheel B the plate will yield sufficiently to prevent breaking. The eccentricity of the cam is such that the plungers will force the pressed bricks out of the molds gradually in such manner that they will drop upon the traveling apron H as soon as the mold is completely inverted by the revolution of the wheel. In order to prevent jarring the bricks, and thereby injuring them, I give the apron a motion corresponding to that of the mold-wheel by means of the wheel I, carrying the apron and secured to the drive-shaft J. The mold-wheel is driven by the gearing K L on each side thereof.

As the machine is intended for making brick from clay as it comes directly from the bank, I provide for the grinding of the clay while it is being fed to the molds and by the same power which operates the molds. In connection with the main drive-shaft J, I arrange a vertical shaft, M, on the outside of the frame A, and provide it with suitable gearing for operating one or more shafts, N, arranged inside the frame in a vertical position, and having their bearings at their upper ends. These pendent shafts N are provided with propeller-blades O, having knives on the under side for grinding the clay and distributing it to the molds. A scraper, P, is provided for giving the pressed brick a plane surface on its outer side.

Having thus described my invention, what I claim, and desire to secure by Letters Patent, is—

1. In a brick-machine, the mold-wheel constructed of the shells B', having radial guides b' on the inner surface thereof, and the partitions F, secured between the shells in recesses near their peripheral edges, substantially as shown and described.

2. In a brick-machine having plungers arranged in peripheral contact with a stationary cam, the combination, with the cam having recesses E in its sides, of the plungers formed with parts e', one of which is made removable, and which are provided with friction-rollers $e^2$, arranged in said recesses, substantially as shown and described.

3. In a brick-machine, the combination, with the mold-wheel, of a press consisting of a number of curved plates hinged to the frame-work and to each other, and a number of weighted levers for holding the plates in contact with the wheel, as and for the purpose described.

4. In a brick-machine, the combination, with the stationary shaft, of the mold-wheel formed of two shells having hubs which are provided with circular recesses and have friction-rollers arranged in the recesses, substantially as shown and described.

5. In a brick-machine, the combination, with the mold-wheel, of a grinding and feeding apparatus consisting of a number of vertical pendent shafts, N, having blades provided with knives, and propellers, said shafts being arranged in line with the wheel, substantially as shown and described.

JOHN OWEN SMITH.

Witnesses:
JAMES LEONARD,
RICHARD W. JANTZEN.